US012360970B1

United States Patent
Shay et al.

(10) Patent No.: US 12,360,970 B1
(45) Date of Patent: Jul. 15, 2025

(54) MAINTAINING CONSISTENT UNIQUE IDENTIFIERS IN ASSET MANAGEMENT SYSTEMS

(71) Applicant: Axonius Solutions Ltd., Tel-Aviv (IL)

(72) Inventors: Eli Shay, Harish (IL); Oded Eliyahu Shimon, Holon (IL); Ben Shimon Hazout, Gan Yavne (IL); Avital Yahel, Harish (IL); Ran Avital, Omer (IL)

(73) Assignee: Axonius Solutions Ltd., Tel-Aviv (IL)

( * ) Notice: Subject to any disclaimer, the term of this patent is extended or adjusted under 35 U.S.C. 154(b) by 0 days.

(21) Appl. No.: 18/964,762

(22) Filed: Dec. 2, 2024

(51) Int. Cl.
*G06F 16/00* (2019.01)
*G06F 16/215* (2019.01)

(52) U.S. Cl.
CPC .................. *G06F 16/215* (2019.01)

(58) Field of Classification Search
CPC ..... G06F 1/00; G06F 3/00; G06F 5/00; G06F 7/00; G06F 8/00; G06F 9/00; G06F 11/00; G06F 12/00; G06F 13/00; G06F 15/00; G06F 16/00; G06F 17/00; G06F 18/00; G06F 21/00; G06F 30/00; G06F 40/00; G06F 16/9024; G06F 16/248; G06F 16/24556; G06F 16/26; G06F 16/287; G06F 16/288; G06F 18/241; G06F 3/04815; G06F 3/167; G06F 9/542; G06Q 20/326; G06Q 20/401; G06Q 20/123; G06Q 10/20; G06Q 10/06; G06Q 40/06; H04L 1/00; H04L 5/00; H04L 9/00; H04L 63/1408; H04L 63/1425; H04L 63/1433
See application file for complete search history.

(56) References Cited

U.S. PATENT DOCUMENTS

| | | | |
|---|---|---|---|
| 2016/0253651 A1* | 9/2016 | Park | G06Q 20/34 705/39 |
| 2016/0323243 A1* | 11/2016 | LeVasseur | G06N 20/00 |
| 2023/0196242 A1* | 6/2023 | Kumar | G06F 16/9024 705/7.27 |
| 2023/0237404 A1* | 7/2023 | Jayathirtha | G06Q 10/06393 705/7.28 |
| 2024/0118680 A1* | 4/2024 | Dinkel | G05B 19/41835 |

\* cited by examiner

*Primary Examiner* — Shyue Jiunn Hwa

(57) ABSTRACT

A system and method for maintaining consistent unique identifiers in asset management systems is disclosed. The invention computes a unique identifier for an asset by analyzing digital records associated with digital asset descriptors and received from multiple management domains. A reliability test is applied to determine the most reliable record, and its domain identifier is assigned as the unique identifier for the asset. The system can handle merging of descriptors, conflict resolution, and updates based on new information. The consistent unique identifiers enable efficient execution of various management operations across multiple domains.

19 Claims, 10 Drawing Sheets

MAINTAINING CONSISTENT UNIQUE IDENTIFIERS IN ASSET MANAGEMENT SYSTEMS

BACKGROUND

Some embodiments described in the present disclosure relate to asset management systems in computerized environments, and more particularly, but not exclusively, to maintaining consistent unique identifiers for assets across multiple management domains.

Modern environments, for example enterprise organizations, rely on complex networks of interconnected devices, software applications, and users. Managing these diverse assets efficiently is crucial for maintaining security, ensuring compliance, and optimizing operational performance. Asset management systems have evolved to address this need, providing organizations with tools to track, monitor, and manage their diverse information technology (IT) assets.

As used herewithin, the term management domain refers to a distinct area of IT asset management, typically associated with a specific tool, system, or set of processes that handles a particular aspect of asset information and control. A management domain has an identified scope of assets it manages or monitors. The scope of assets a management domain manages may be based on, for example, asset type (e.g., hardware, software, user accounts), organizational division (e.g., department, geographical location), or functional area (e.g., security, inventory, performance). The scope may be based on a combination of criteria.

Within a management domain an asset usually has a unique identifier, by which a domain manager of the management domain identified the asset. As used herewithin, the term domain manager refers to a software component, system, or application responsible for managing assets within a specific management domain. Different domain managers may use different types of identifiers. Some examples of an identifier include a running serial number (for example an employee identification number), a state assigned identification number, a license key number, and a network address (a MAC address or an IP address, for example).

In traditional asset management systems the management of assets is distributed across multiple specialized domains, each focused on specific aspects of asset management.

SUMMARY

It is an object of some embodiments described in the present disclosure to provide a system and a method that address the challenge of assets of a computerized system being represented differently across multiple management domains of the computerized system by implementing a reliability-based selection process for determining the most suitable identifier for each asset.

The foregoing and other objects are achieved by the features of the independent claims. Further implementation forms are apparent from the dependent claims, the description and the figures.

According to a first aspect, a method for managing a plurality of assets of a computerized system comprises: computing a unique identifier for an asset of the plurality of assets comprises: for a digital asset descriptor of a plurality of digital asset descriptors, the digital asset descriptor describing the asset and comprising a plurality of digital entity descriptors and associated with a plurality of digital records, each digital entity descriptor describing the asset in a management domain and associated with a subset of the plurality of digital records, the subset of the plurality of digital records received from a domain manager of the management domain and comprising a domain identifier identifying the asset in said management domain: applying to the plurality of digital records a reliability test to determine a highest reliability record; assigning the domain identifier of the highest reliability record as the unique identifier for the asset; and marking the highest reliability record in the digital asset descriptor to produce an updated plurality of digital asset descriptors; and executing in the computerized system and using the updated plurality of digital asset descriptors at least one management operation associated with the asset. Using a most-reliable domain identifier as a unique identifier of an asset increases likelihood of uniquely identifying the asset compared to randomly selecting a domain identifier associated with the asset, increasing accuracy of managing the plurality of assets and thus increasing stability and accuracy of operation of the computerized system. Using a domain identifier as a unique identifier of the asset and not an independently generated asset reduces complexity of managing the plurality of assets by reducing an amount of identifiers associated with the asset.

According to a second aspect, a system for managing a plurality of assets of a computerized system comprises at least one hardware processor configured to: compute a unique identifier for an asset of the plurality of assets, comprising: for a digital asset descriptor of a plurality of digital asset descriptors, the digital asset descriptor describing the asset and comprising a plurality of digital entity descriptors and associated with a plurality of digital records, each digital entity descriptor describing the asset in a management domain and associated with a subset of the plurality of digital records, the subset of the plurality of digital records received from a domain manager of the management domain and comprising a domain identifier identifying the asset in said management domain: applying to the plurality of digital records a reliability test to determine a highest reliability record; assigning the domain identifier of the highest reliability record as the unique identifier for the asset; and marking the highest reliability record in the digital asset descriptor to produce an updated plurality of digital asset descriptors; and execute in the computerized system and using the updated plurality of digital asset descriptors at least one management operation associated with the asset.

According to a third aspect a software program product for managing a plurality of assets of a computerized system comprises: a non-transitory computer readable storage medium; first program instructions for computing a unique identifier for an asset of the plurality of assets, comprising: for a digital asset descriptor of a plurality of digital asset descriptors, the digital asset descriptor describing the asset and comprising a plurality of digital entity descriptors and associated with a plurality of digital records, each digital entity descriptor describing the asset in a management domain and associated with a subset of the plurality of digital records, the subset of the plurality of digital records received from a domain manager of the management domain and comprising a domain identifier identifying the asset in said management domain: applying to the plurality of digital records a reliability test to determine a highest reliability record; assigning the domain identifier of the highest reliability record as the unique identifier for the asset; and marking the highest reliability record in the digital asset descriptor to produce an updated plurality of digital asset descriptors; and second program instructions for executing in the computerized system and using the updated plurality of digital asset descriptors at least one management operation associated with the asset. According to the second aspect, the first and second program instructions are executed by at least one computerized processor from the non-transitory computer readable storage medium.

With reference to the first and second aspects, in a first possible implementation of the first and second aspects the method further comprises for each other asset of at least one other asset of the plurality of assets computing another unique identifier, comprising: for another digital asset descriptor of the plurality of digital asset descriptors, the other digital asset descriptor describing the other asset and comprising a plurality of other digital entity descriptors and associated with a plurality of other digital records, each other digital entity descriptor describing the other asset in the management domain and associated with a subset of the plurality of other digital records, the subset of the other plurality of digital records received from the domain manager of the management domain and comprising another domain identifier identifying the other asset in said management domain: applying to the plurality of other digital records the reliability test to determine another highest reliability record; assigning the other domain identifier of the other highest reliability record as the other unique identifier for the other asset; and marking the other highest reliability record in the other digital asset descriptor to produce an updated plurality of other digital asset descriptors. Computing unique identifiers for more than one asset increases accuracy of the plurality of digital asset descriptors, increasing accuracy of operation of the computerized system when managed using the plurality of digital asset descriptors.

With reference to the first and second aspects, in a second possible implementation of the first and second aspects the method further comprises: identifying in the plurality of digital asset descriptors at least one additional digital asset descriptor describing the asset and comprising a plurality of additional digital entity descriptors and associated with a plurality of additional digital records; merging the at least one additional digital asset descriptor with the digital asset descriptor; and adding the respective plurality of additional digital records of each of the at least one additional asset descriptor to the plurality of digital records associated with the digital asset descriptor. Optionally, computing the unique identifier comprises applying the reliability test to the plurality of digital records including the respective plurality of additional digital records of each of the at least one additional asset descriptor. Merging two or more descriptors describing the same asset reduces an amount of computer resources required to manage the plurality of assets. Optionally, the plurality of digital records can be clustered into at least two subsets of digital records, each associated with one of the plurality of digital entity descriptors. Optionally, the method further comprises: computing a conflict between two or more digital records of the plurality of digital records by applying one or more rules to the plurality of digital records; generating at least one new digital asset descriptor describing yet another asset of the plurality of assets, the at least one new digital asset descriptor associated with at least one digital entity descriptor of the plurality of digital entity descriptors, where the at least one digital entity descriptor is associated with yet another subset of the plurality of digital records comprising at least one digital record one of the two or more digital records; removing the association between the digital asset descriptor and the at least one digital record to generate an updated plurality of digital records associated with the digital asset descriptor; computing a first new unique identifier for the asset comprising applying the reliability test to the updated plurality of digital records; and computing a second new unique identifier for the yet another asset comprising applying the reliability test to the yet another subset of the plurality of digital records. Computing a conflict between two or more digital records and splitting an asset descriptor into two or more other asset descriptors in response to computing the conflict increase accuracy of the plurality of asset descriptors in representing the plurality of assets, increasing accuracy of operation of the computerized system when managed using the plurality of digital asset descriptors.

With reference to the first and second aspects, in a third possible implementation of the first and second aspects the method further comprises receiving a plurality of new digital records from one or more of the plurality of domain managers and associating at least one new digital record of the plurality of new digital records with the digital asset descriptor to produce another updated plurality of digital records associated with the digital asset descriptor. Optionally, computing the unique identifier comprises applying the reliability test to the updated plurality of digital records. Using a plurality of new digital records to compute the unique identifier increases accuracy of the computed unique identifier over time, increasing accuracy of the plurality of asset descriptors in representing the plurality of assets over time, thus increasing accuracy of operation of the computerized system when managed using the plurality of digital asset descriptors.

With reference to the first and second aspects, in a fourth possible implementation of the first and second aspects applying the reliability test comprises: computing a plurality of reliability scores, each reliability score for a digital entity descriptor of the plurality of entity descriptors; and computing a best reliability score of the plurality of reliability scores according to at least one score comparison test applied to the plurality of reliability scores; and selecting a digital record associated with the respective digital entity descriptor having the best reliability score as the 20 highest reliability record. Optionally, computing the reliability score for a digital entity descriptor comprises using one or more of: a source identifier of a source of the subset of digital records associated with the digital entity descriptor, an amount of digital records in the subset of digital records associated with the digital entity descriptor, a time of arrival of one or more of the subset of digital records associated with the digital entity descriptor, a classification of a source of the subset of digital records associated with the digital entity descriptor, and a reliability ranking of a source of the subset of digital records associated with the digital entity descriptor. Using a reliability measure of an entity descriptor, describing an asset in a management domain, to select a domain identifier to use as a unique identifier increases likelihood of the selected domain identifier being an accurate unique identifier of the asset. Optionally, the plurality of reliability scores comprises a first reliability score computed for a first digital entity descriptor of the plurality of digital entity descriptors and a second reliability score computed for a second digital entity descriptor of the plurality of digital entity descriptors. Optionally, a first subset of digital records associated with the first entity descriptor was received from a first source classified as a domain management application of a management domain, a second subset of digital records associated with the second entity descriptor was received from a second source classified as a scanning application, configured to scan the computerized system, and the first reliability score is better than the second reliability score according to the at least one score comparison test applied to the plurality of reliability scores. A domain manager is more reliable than a scanner, thus an identifier based on a domain identifier from a record received from a domain manager is more likely to be unique than another domain identifier from another record received from a scanner. Optionally, a first subset of digital records associated with the first entity descriptor was received from a first source classified as a first domain management application of a first management domain having a first reliability ranking, and a second subset of digital records associated with the second entity descriptor was received from a second source classified as a second domain management application of a second management domain having a second reliability ranking. Optionally, the first reliability ranking is higher than the second reliability ranking and the first reliability score is better than the second reliability score according to the at least one score comparison test applied to the plurality of reliability scores. An identifier based on a domain identifier from a record received from a more reliable domain manager is more likely to be unique than another domain identifier from another record received from a less reliable domain manager. Optionally, a first subset of records associated with the first digital entity descriptor consists of a first amount of records received from a first source and a second subset of records associated with the second digital entity descriptor consists of a second amount of records received from the second source. Optionally, the first amount of records is greater than the second amount of records, and the first reliability score is better than the second reliability score according to the at least one score comparison test applied to the plurality of reliability scores. An identifier based on a domain identifier from a record received from a source that provides more information is more likely to be unique than another domain identifier from another record received from a source that provides less information. Optionally, a first subset of digital records associated with the first digital entity descriptor comprises a first digital record received at a first time, and a second subset of digital records associated with the second digital entity descriptor comprises a second digital record received at a second time. Optionally, the first time is earlier than the second time and the first reliability score is better than the second reliability score according to the at least one score comparison test applied to the plurality of reliability scores. Optionally, a first subset of digital records associated with the respective digital entity descriptor having the best reliability score comprises a first digital record received at a first time and a second digital record received at a second time. Optionally, the first time is earlier than the second time, and the first digital record is selected as the highest reliability record. An earlier received record is considered more reliable than a newly arrived record.

With reference to the first and second aspects, in a fifth possible implementation of the first and second aspects the at least one management operation is executed by at least one management software object managing at least part of the computerized system and the at least one management software object identifies the asset according to the unique asset identifier. Optionally, the at least one management software object is at least part of a security management software tool. Optionally, the at least one management software object is at least part of an instrumentation software tool. Optionally, the at least one management operation is at least one of: modifying at least one value in at least one configuration file of the computerized system, installing at least one software application on at least one device of a plurality of devices of the computerized system, modifying at least one other value in at least one other configuration file of at least one device of a plurality of devices of the computerized system, and sending a domain manager of a management domain an instruction to execute an operation of the management domain. Optionally, executing the at least one management operation comprises instructing a first domain manager of a first management domain to execute a first operation and instructing a second domain manager of a second management domain to execute a second operation. Using the unique identifier selected according to the reliability score to identify the asset when instructing execution of one or more management operations, in one or more management domains, reduces errors in managing the plurality of assets compared to using more than one identifier to identify the asset.

With reference to the first and second aspects, in a sixth possible implementation of the first and second aspects the asset is one of: a device of a plurality of devices of the computerized system, a software entity of a plurality of software entities of the computerized system, and a user of the computerized system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Figure 1:
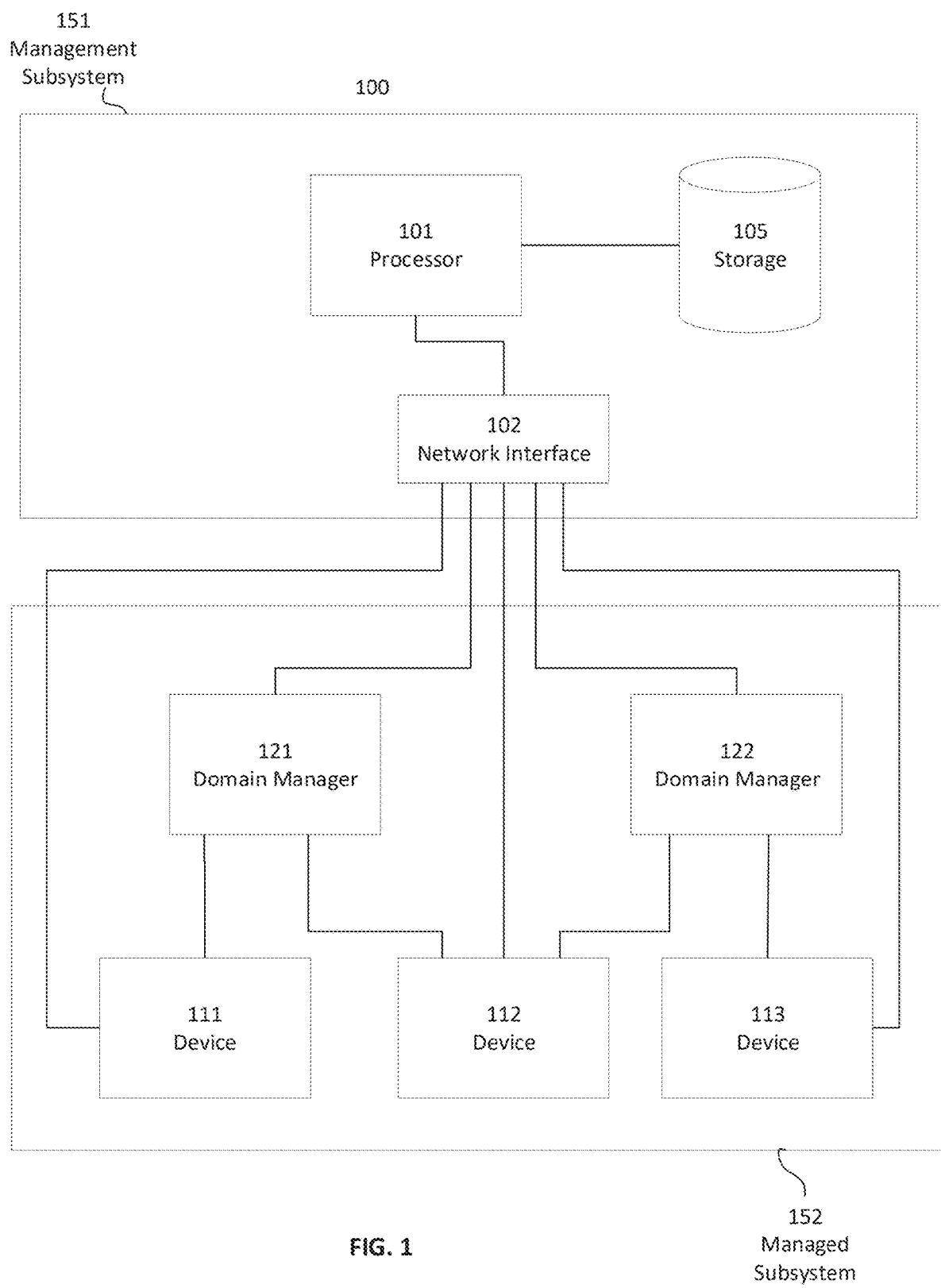
FIG. 1 is a schematic block diagram of an exemplary system, according to some embodiments.

When a computerized system comprises a plurality of management domains, and each of the management domains is managed independently, information about a single asset of a plurality of assets of the computerized system is spread across multiple domain managers, making it difficult to get a comprehensive view of the asset's status, history, and relationships with other assets of the plurality of assets. In addition, when asset information is updated in one management domain, it may not be immediately reflected in others, leading to inconsistencies and potential security risks. Furthermore, many IT processes and workflows span multiple management domains. For example, onboarding a new employee might involve actions in asset procurement, network configuration, security policy application, and identity management. Performing management tasks that span multiple management domains requires interacting with multiple domain managers, often manually.

For brevity, unless otherwise noted henceforth the term "domain" is used to mean "management domain", and the terms are used interchangeably. In addition, for brevity the term "management system" is henceforth used to mean "asset management system" and unless otherwise noted the terms are used interchangeably.

In modern enterprise IT environments there is a growing need to maintain a comprehensive and consistent view of an organization's assets. The need to combine the management of multiple management domains stems from the increasing complexity of IT environments and the growing importance of holistic, efficient asset management. By addressing this need, organizations can achieve greater visibility, consistency, and control over their IT assets, leading to improved operational efficiency, reduced risks, and better strategic decision-making.

In the context of asset management, a scanner typically refers to a software tool or utility used to identify, track, and gather information about various assets within an organization's IT environment. Scanners are typically external to the assets of the IT environment. In the context of asset management, an agent typically refers to a software tool or utility installed on one or more assets of the IT environment. Agents typically are at least part of a domain manager. When information about the one or more assets is collected from a domain manager it may be collected from one or more agents.

Some existing asset management systems, that provide a solution for combining management of multiple domains, include aggregating data from multiple management domains into a central repository. In such management systems, information about the plurality of assets can be collected from multiple management domains (from domain managers and/or scanners). Within each management domain, an asset of the computerized system is represented as a distinct entity and is assigned a domain entity identifier, which uniquely identifies the asset within that specific management domain; however, as described above, these domain entity identifiers may be different from each other. For example one domain may identify a laptop computer by its MAC address, whereas another domain may identify the same laptop computer by its serial number. It is possible to merge the different domain entities into a unified entity. This unified entity needs a unique identifier within the unified asset management system.

It is possible to maintain a new, separate identifier for each asset in the management system; however, reusing an existing identifier from an existing management domain offers significant practical advantages. Reusing an existing identifier from an existing management domain reduces complexity, improves traceability, and facilitates better integration with existing tools and processes. Nevertheless, as availability of management domain information changes over time, an entity's domain identifier from a management domain might become unavailable. When such an entity domain identifier is used as the asset's unique identifier in the asset management system, this may result in changes in the unique identifier of the asset in the management system. Frequent changes in an asset's unique identifier within the management system could cause data integrity issues and inconsistencies across the system, could disrupt ongoing operations and automated processes, could complicate integrations with external systems and tools and could have a negative impact on audit, reporting and analytics processes.

Imposing a standard way to identify assets across different management systems is not practical, due to the diverse nature of assets and the entrenchment of existing systems.

There is a clear need for a management system that can dynamically compute and maintain consistent unique identifiers for assets within the management system and across all management domains of the computerized system and provide a reliable basis for cross-domain management operations. This need includes the ability to reconcile conflicting or changing information from multiple sources and to adapt to the changing nature of assets and management systems over time.

To address these needs, the present disclosure, in some embodiments described herein, introduces a novel approach to computing and maintaining consistent unique identifiers based on a sophisticated reliability assessment of information from multiple management domains. In such embodiments, each of a plurality of digital asset descriptors is a digital data structure describing one of a plurality of assets of a computerized system and comprises a plurality of digital entity descriptors. A digital entity descriptor of the plurality of digital entity descriptors is another digital data structure that describes the asset in one of a plurality of management domains of the system. Optionally, the digital asset descriptor is associated with a plurality of digital records and each digital entity descriptor of the plurality of digital entity descriptors is associated with a subset of the plurality of digital records, where the subset of the plurality of digital records was received from a domain manager of the management domain in which the digital entity descriptor describes the asset. Optionally, each of the subset of the plurality of digital records associated with the digital entity descriptor comprises a domain identifier that identifies the asset in the management domain in which the digital entity descriptor describes the asset. Optionally, a reliability test is applied to the plurality of digital records to determine a highest reliability record. Optionally, the domain identifier of the highest reliability record is assigned as the unique identifier of the asset and the highest reliability record is marked in the digital asset descriptor. Optionally, an updated plurality of digital asset descriptors, created by marking the highest reliability record in the digital asset descriptor is used to execute one or more management operations associated with the asset. Identifying a highest reliability record allows identifying which domain identifier that identifies the asset is least likely to change and therefor is a preferred identifier to use as a unique identifier for the asset in the plurality of digital asset descriptors. As described above, identifying the asset in the management system using a domain identifier that is less likely to change over time than others allows enjoying the advantages of having a stable unique identifier for the asset, e.g. consistency and preservation of data integrity, as well as the advantages of having an identifier for the asset that is an identifier in one of the plurality of domains of the system, namely better integration with existing tools and processes. Some examples of a management operation include modifying one or more values in a configuration file of the system or in another configuration file of a device of a plurality of devices of the system, installing one or more software applications on one or more devices of a plurality of devices of the system, and sending a domain manager of a management domain an instruction to execute an operation of the management domain. Some other examples include fetching information describing an asset consistently via an application programming interface (API) of the asset management system and exporting data from the asset management system for integration with other systems and additionally or alternatively for using in reports. A management operation may be performed by management software, for example a security management tool or an instrumentation tool (for installations, updates etc.). Executing a management operation using a digital asset descriptor in which the domain identifier of the highest reliability record is marked increases accuracy of the management operation and increases stability of the computerized system compared to using a less reliable identifier to identify the asset in the management system. Optionally, the unique identifier for the asset in the plurality of digital asset descriptors is computed by applying a hash function to the preferred identifier.

There are a variety of factors that affect the reliability of a digital record. Some sources of digital records are considered more reliable than others, for example a domain management application may be considered more reliable than a scanning application that is configured to scan the system. A plurality of domains of the system may have different reliability rankings, and so a digital record's reliability may be affected by the reliability ranking of the domain management application from which the digital record was received. Optionally, there is a continuous hierarchy among the plurality of domains of the system. For example, Microsoft Active Directory may have absolute priority. Optionally, a source that provided more digital records may be considered more reliable that another source that provided fewer digital records. Optionally, a digital record's reliability is affected by a time in which it arrived, for example a digital record received at a first time may be considered more reliable than another digital record received at another time later than the first time.

Optionally, a reliability score is computed for each of the plurality of digital entity descriptors and a best reliability score is computed by applying one or more score comparison tests to a plurality of reliability scores of the plurality of digital entity descriptors. Optionally, applying the reliability test to the plurality or records comprises computing the best reliability score and selecting a digital record associated with the respective digital entity descriptor that has the best reliability score as the highest reliability record.

Optionally, a unique identifier may be computed for an asset periodically. Optionally merging of two or more digital asset descriptors of the plurality of digital asset descriptors, for example when it is identified that the two or more digital asset descriptors describe a common asset, may comprise computing a unique identifier for the asset. Optionally, splitting a digital asset descriptor of the plurality of digital asset descriptors, for example when it is identified that the digital asset descriptor actually describes more than one asset, may comprise computing one or more unique identifiers, one for each of a set of new digital asset descriptors created by splitting the digital asset descriptor.

Unlike static systems, the presently proposed solution continuously evaluates the reliability of asset identifiers based on multiple factors. The proposed solution works across any number of management domains without requiring standardization across these domains. The solution includes built-in mechanisms for resolving conflicts when merging or splitting asset descriptors, a feature often lacking in traditional systems. A system implementing the proposed solution can adapt to changes in the IT environment, such as the addition of new management domains or changes in the reliability of existing domains. Unlike asset management systems that create new identifiers, the present solution selects from existing identifiers, facilitating better integration with domain-specific tools and processes. The proposed approach is inherently scalable, capable of handling a growing number of assets and domains without fundamental changes to the system. The proposed solution for maintaining consistent unique identifiers in an asset management system offers a novel, flexible, and efficient solution to a complex problem. By dynamically assessing reliability across domains and selecting the most appropriate existing identifier, the proposed solution overcomes many limitations of current approaches for asset management, where asset identifiers may be inconsistent, or stale, or even both. The present solution promises to significantly improve asset management in multi-domain environments, offering benefits in data consistency, operational efficiency, and adaptability to changing IT landscapes.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For brevity, henceforth the term "asset descriptor" is used to mean "digital asset descriptor" and the terms are used interchangeably. In addition, for brevity henceforth the term "entity descriptor" is used to mean "digital entity descriptor" and the terms are used interchangeably. Furthermore, for brevity henceforth the term "record" is used to mean "digital record" and the terms are used interchangeably.

Reference is now made to FIG. 1, showing a schematic block diagram of an exemplary computerized system 100, according to some embodiments. In such embodiments, at least one hardware processor 101 is connected to one or more network connected devices, for example network connected device 111, network connected device 112 and network connected device 113. Examples of a network connected device are a computer, a mobile computer, a network device such as a router, and a virtual machine executing on a host machine. For brevity, henceforth the term "processor" means "at least one hardware processor". In addition, for brevity henceforth the term "device" means "network connected device". Optionally, device 111, device 112 and device 113 are connected to processor 101 via at least one digital communication network. Optionally, the digital communication network is a Local Area Network (LAN), for example an Ethernet network or a wireless network. Optionally, the digital communication network is a Wide Area Network (WAN), for example the Internet. Optionally, processor 101 is connected to at least one digital communication network interface 102 for the purpose of connecting to device 111, device 112 and device 113 via the at least one digital communication network.

Optionally, some of the one or more devices are associated with one of a plurality of management domains. Optionally, system 100 comprises one or more domain managers, each associated with one of the plurality of management domains. For example, domain manager 121 may be associated with a first management domain of the plurality of management domains and domain manager 122 may be associated with a second management domain of the plurality of management domains. Some examples of a management domain are Microsoft Active Directory, AWS, VmWare ESXi, and McAfee ePO. Optionally, some of the one or more domain managers are connected to some of the one or more devices, optionally via at least one other digital communication network. For example, device 111 and device 112 are optionally associated with the first management domain of the plurality of management domains and may be connected to domain manager 121. Optionally, device 112 and device 113 are associated with the second management domain of the plurality of management domains and may be connected to domain manager 122. Optionally, at least one of the one or more domain managers manages assets that are not network connected devices, additionally or alternatively to managing one or more devices. Some examples of an asset that is not a network connected device include, but are not limited to, a software entity of a plurality of software entities of the computerized system and a user of the computerized system. A software entity may be a software application. Optionally a software entity is a service. Optionally, processor 101 is connected to at least one of the one or more network connected devices via the one or more domain managers. For example, processor 101 may be connected to device 111 and device 112 via domain manager 121, and to device 112 and device 113 via domain manager 122.

Optionally, one or more of the plurality of devices each have a storage. Examples of a storage are a random access memory and a hard disk. Optionally, network connected device 112 has a storage.

Optionally, processor 101 is connected to at least one non-volatile digital storage 105 for the purpose of storing a plurality of digital asset descriptors, each describing one of a plurality of assets of system 100. Some examples of a non-volatile digital storage are a magnetic hard disk, a solid state hard disk, a non-volatile random access memory (NVRAM), a network connected storage and a storage network.

Optionally, system 100 comprises a managed subsystem 152 comprising the plurality of assets of system 100, for example device 111, device 112 and device 113. Optionally, the managed subsystem comprises the one or more domain managers, for example domain manager 121 and domain manager 122. Optionally, system 100 comprises a management subsystem 151 for managing the plurality of assets of system 100. For example, subsystem 151 may comprise processor 101, at least one non-volatile digital storage 105 and at least one digital communication network interface 102, optionally for the purpose of connecting to one or more components of managed subsystem 152.

Optionally, managed subsystem 152 and management subsystem 151 are located on a common premises. Optionally, managed subsystem 152 is remote to management subsystem 151.

For simplicity, the following description focuses on exemplary assets that are devices, however the methods described may be used for other types of assets as mentioned above.

To manage the plurality of assets, in some embodiments system 100 implements the following optional method.

Figure 2:
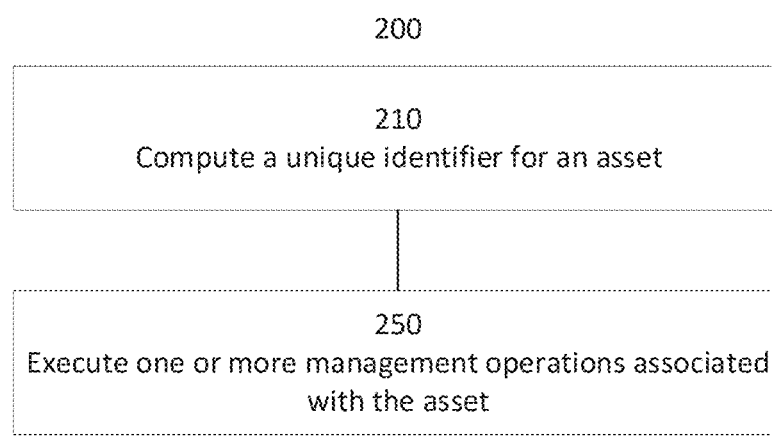
FIG. 2 is a flowchart schematically representing an optional flow of operations for managing a plurality of assets, according to some embodiments.

Reference is now made also to FIG. 2, showing a flowchart schematically representing an optional flow of operations 200 for managing a plurality of assets, according to some embodiments. In such embodiments, in 210 processor 101 computes a unique identifier for an asset of a plurality of assets of system 100.

Figure 3:
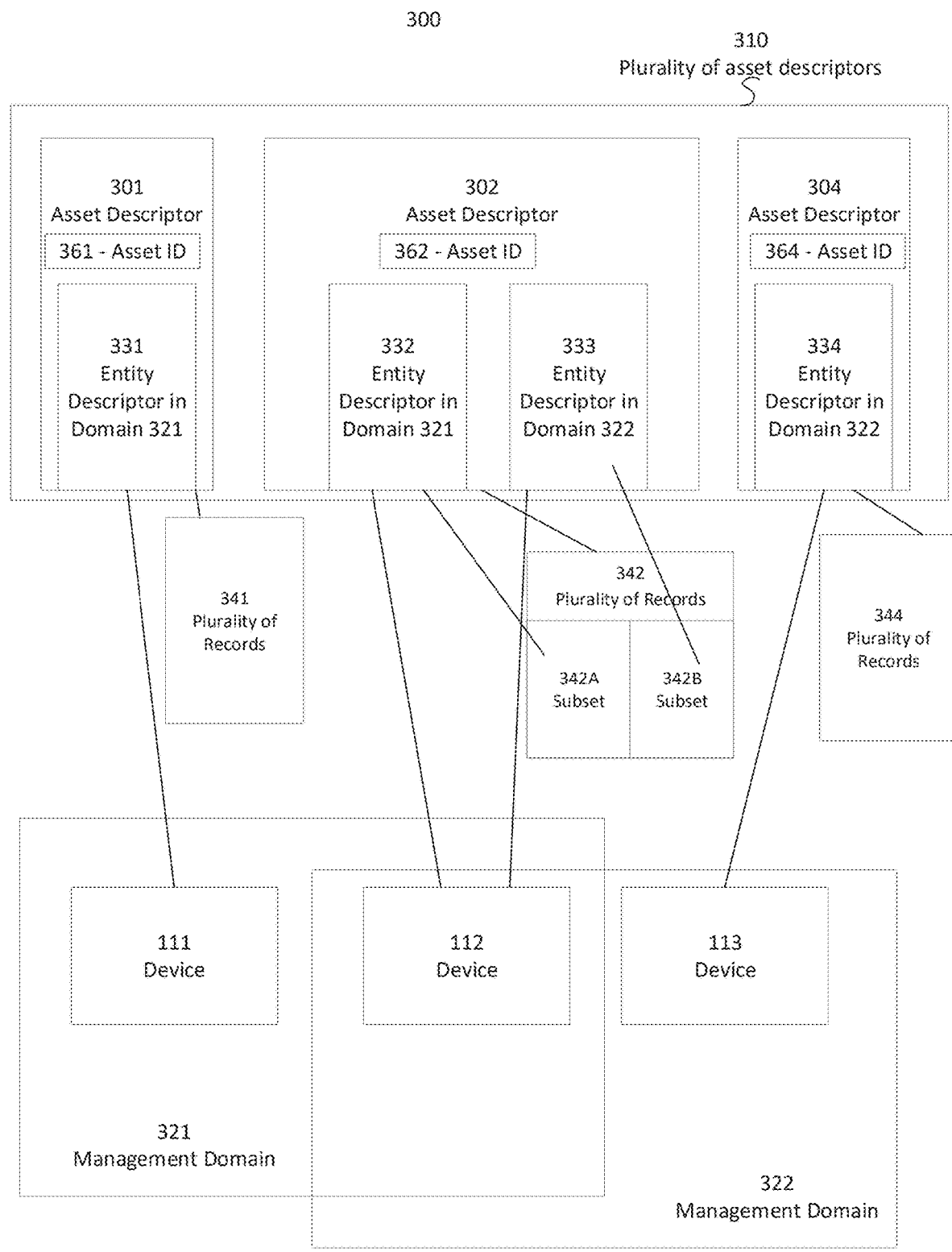
FIG. 3 is a schematic block diagram of an exemplary plurality of digital asset descriptors, according to some embodiments.

Reference is now made also to FIG. 3, showing a schematic block diagram of an exemplary plurality of digital asset descriptors 300, according to some embodiments. In such embodiments, each asset descriptor of a plurality of digital asset descriptors describes an asset of a plurality of assets of system 100. In this example, plurality of asset descriptors 310 comprises asset descriptor 301 describing device 111, asset descriptor 302 describing device 112 and asset descriptor 304 describing device 113. Optionally, device 111 and device 112 are managed in management domain 321, for example by domain manager 121. Optionally, device 112 and device 113 are managed in management domain 322, for example by domain manager 122. In this example, device 112 is managed by both domain manager 121 in management domain 321 and by domain manager 122 in management domain 322.

Optionally, each asset of the plurality of asset descriptors comprises a plurality of entity descriptors, where each entity descriptor describes the asset in a management domain. In this example asset descriptor 301 comprises entity descriptor 331 describing device 111 in management domain 321, asset descriptor 304 comprises entity descriptor 334 describing device 113 in management domain 322, and asset descriptor 302 comprises entity descriptor 332 describing device 112 in management domain 321 and entity descriptor 333 describing device 112 in management domain 322.

Optionally, each asset descriptor of plurality of asset descriptors 310 is associated with a plurality of digital records. In this example, asset descriptor 301 is associated with plurality of records 341, asset descriptor 302 is associated with plurality of records 342 and asset descriptor 304 is associated with plurality of records 344. Optionally, at least some of plurality of records 341, plurality of records 342 and plurality of records 344 were received from one or more of domain manager 121 and domain manager 122, optionally via at least one digital network interface 102.

Optionally, asset descriptor 301 comprises asset identifier 361, optionally identifying device 111. Optionally, asset descriptor 302 comprises asset identifier 362, optionally identifying device 112. Optionally, asset descriptor 304 comprises asset identifier 364, optionally identifying device 113.

Optionally, each entity descriptor that is included in an asset descriptor is associated with a subset of the plurality of records associated with the asset descriptor. Optionally, the plurality of records associated with the asset descriptor can be clustered in one or more subsets of records, each subset associated with one of the plurality of management domains of system 100 and received from a domain manager of the management domain the subset of records is associated with. In this example, entity descriptor 332 of asset descriptor 302 is associated with subset 342A of plurality of records 342, where subset of records 342A is received from domain manager 121 and associated with management domain 321. Further in this example, entity descriptor 333 of asset descriptor 302 is associated with subset 342B of plurality of records 342, where subset of records 342B is received from domain manager 122 and associated with management domain 322.

Optionally, each record of a subset of records comprises a domain identifier that identifies the asset in the management domain with which the subset of records is associated. Thus, in this example each of subset of records 342A comprises a first domain identifier identifying asset 112 in management domain 121 and each of subset of records 342B comprises a second domain identifier identifying asset 112 in management domain 122.

Reference is now made again to FIG. 2. Optionally, in 210 processor 101 computes a unique identifier for asset 112. Optionally, asset identifier 362 is the unique identifier for asset 112.

Figure 4:
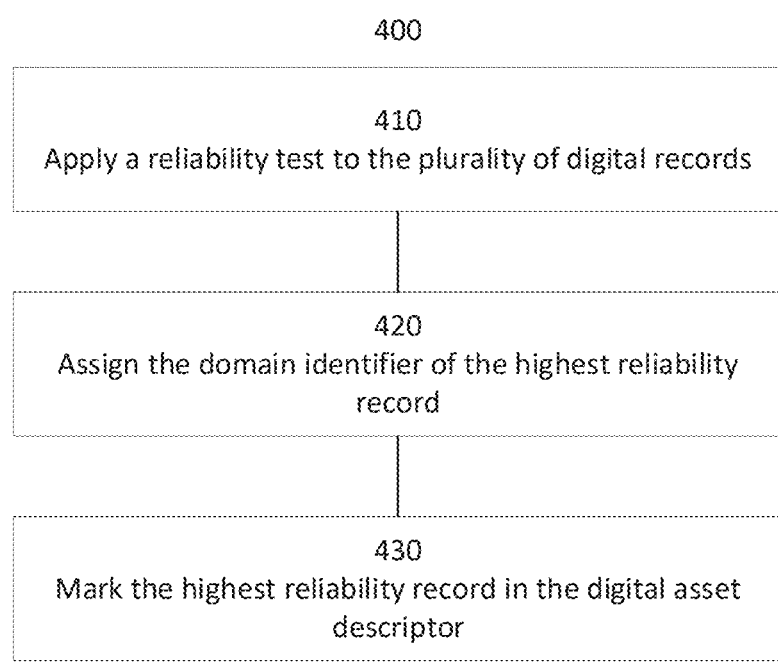
FIG. 4 is a flowchart schematically representing an optional flow of operations for computing a unique identifier, according to some embodiments.

Reference is now made also to FIG. 4, showing a flowchart schematically representing an optional flow of operations 400 for computing a unique identifier, according to some embodiments. In such embodiments, in 410 processor 101 applies to plurality of records 342 a reliability test to determine a highest reliability record.

Figure 5:
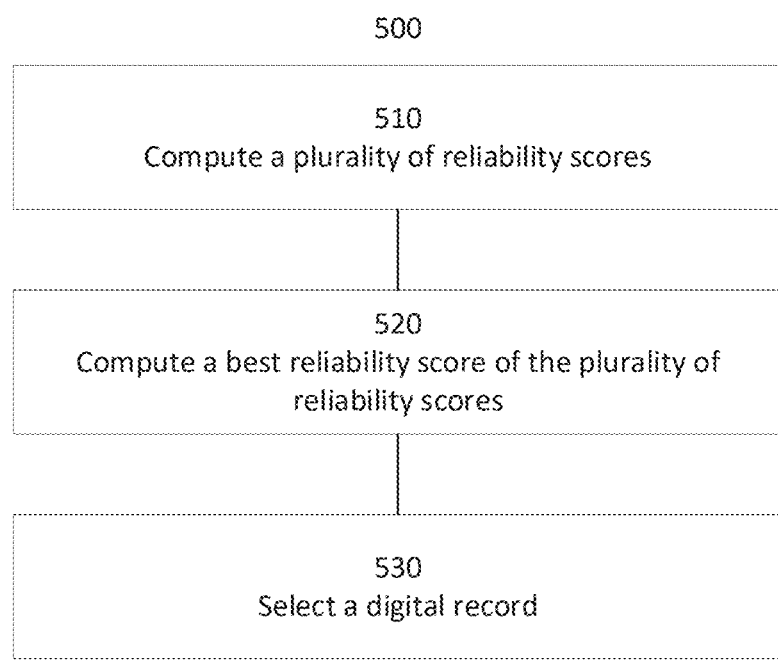
FIG. 5 is a flowchart schematically representing an optional flow of operations for applying a reliability test, according to some embodiments.

Reference is now made also to FIG. 5, showing a flowchart schematically representing an optional flow of operations 500 for applying a reliability test, according to some embodiments. Optionally, in 510 processor 101 computes a plurality of reliability scores, each reliability score of the plurality of reliability scores computed for one of the plurality of entity descriptors of asset-descriptor 302, i.e. one for entity descriptor 332 and one for entity descriptor 333. To compute a reliability score for an entity descriptor, processor 101 may use one or more values indicative of one or more characteristics of a source of the subset of records associated with the entity descriptor. For example, to compute a reliability score for entity descriptor 332, processor 101 optionally uses a source identifier of the source of subset 342A, i.e. a source identifier of management domain 321. Additionally or alternatively, to compute the reliability score for entity descriptor 332, processor 101 optionally uses an amount of records in subset 342A. Additionally or alternatively, to compute the reliability score for entity descriptor 332, processor 101 optionally uses a time of arrival of one or more of records in subset 342A. Additionally or alternatively, to compute the reliability score for entity descriptor 332, processor 101 optionally uses a classification of domain manager 121. Additionally or alternatively, to compute the reliability score for entity descriptor 332, processor 101 optionally uses a reliability ranking of domain manager 121.

For other entity descriptors, processor 101 may use similar values of respective management domains, domain managers and subset of records relevant to the entity descriptor for which the score is computed.

Optionally, the plurality of scores are computed to give higher priority to records from a domain management application of a management domain over other records received from a scanning application. Thus, if domain manager 121 is a domain management application and domain manager 122 is a scanning application, a first score of entity descriptor 332 is optionally better than a second score of entity descriptor 333.

Optionally, one domain manager is more reliable than another domain manager. For example, if domain manager 121 is a first domain management application and domain manager 122 is a second domain management application and domain manager 121 has a first reliability ranking that is higher than a second reliability ranking of domain manager 122, the first score of entity descriptor 332 is optionally better than the second score of entity descriptor 333. Optionally, there is a continuous hierarchy, in terms of reliability, among the plurality of management domains of the system. Optionally, one or more of the plurality of management domains share a common reliability ranking. Optionally, a management domain has absolute priority over other management domains, for example Microsoft Active Directory.

Optionally, a source from which more records were received is considered more reliable than a source from which fewer records were received. Thus, if subset of records 342A consists of more records than subset of records 342B, the first score of entity descriptor 332 is optionally better than the second score of entity descriptor 333.

Optionally, earlier records are more reliable than older records. For example, if subset of records 342A comprises a records that was received earlier than any record in subset of records 342B, the first score of entity descriptor 332 is optionally better than the second score of entity descriptor 333.

In 520, processor 101 optionally computes a best reliability score of the plurality of reliability scores. Optionally, processor 101 computes the best reliability score according to one or more comparison tests applied to the plurality of reliability scores. Optionally, processor 101 first determines whether any of the entity descriptors are associated with a scanner. Optionally, among entity descriptors having equal reliability scores, processor 101 compares the amount of records in each of the respective subsets of records associated with the entity descriptors that have equal reliability scores. Optionally, among one or more subsets of records having equal amounts of records, processor 101 compares the time of arrival of records in the one or more subsets of records.

In 530, processor 101 selects a digital record as the highest reliability record. Optionally, processor 101 selects the highest reliability record from the subset of records associated with the entity descriptor having the best reliability score. For example, if the first score computed for entity descriptor 332 is the best reliability score, processor 101 optionally selects the highest reliability score from subset of records 342A. Optionally, within a subset of records received from a domain manager, a record received earlier is more reliable than a record received later. Optionally, processor 101 selects the earliest received record in subset 342A as the highest reliability record.

Reference is now made again to FIG. 4. Optionally, in 420 processor 101 assigns the domain identifier of the highest reliability record as the unique identifier asset identifier 362 in asset descriptor 302. Optionally, processor 101 applies a hash function to the domain identifier of the highest reliability record and assigns an outcome of applying the hash function as the unique identifier asset identifier 362 in asset descriptor 302. In 430, processor 101 optionally marks the highest reliability record in asset descriptor 302, optionally updating plurality of asset descriptors 310.

Optionally, processor 101 executes 210 according to a schedule of execution. Optionally, the schedule of execution is periodic, repeating execution of 210 at an identified time interval.

Optionally, processor 101 executes 210 when a new plurality of records is received from the one or more domain managers of the system. For example, processor 101 may receive a plurality of other records from the one or more domain managers. Optionally, processor 101 associates one or more of the plurality of other records with asset descriptor 302 to produce an updated plurality of records 342. Optionally, processor 101 applies the reliability test to updated plurality of records 342.

Optionally, processor 101 executes 210 for at least one of one or more other asset descriptors of plurality of asset descriptors 310, for example for asset descriptor 301 and additionally or alternatively asset descriptor 304. Optionally, processor 101 executes 210 when there is a need to merge two or more of the plurality of asset descriptors 310.

Figure 6:
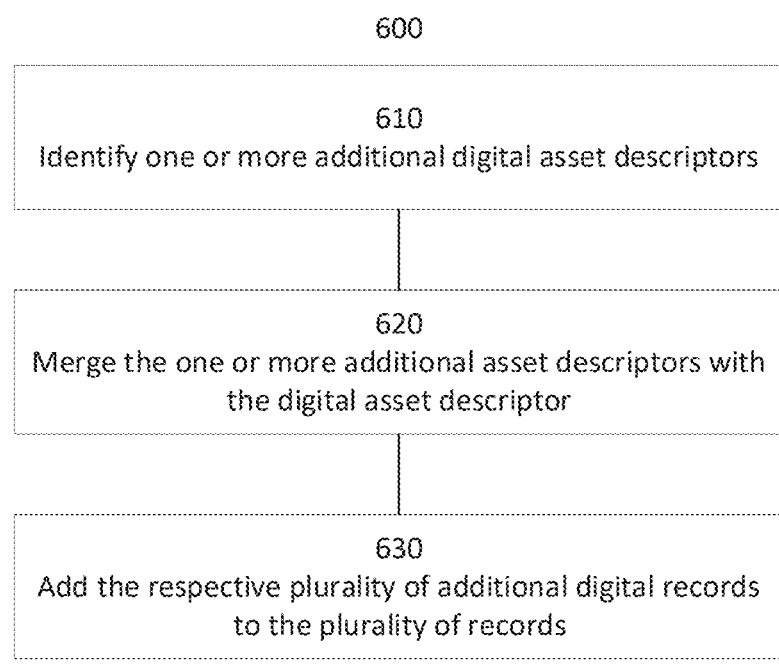
FIG. 6 is a flowchart schematically representing another optional flow of operations for computing a unique identifier, according to some embodiments.
Figure 7:
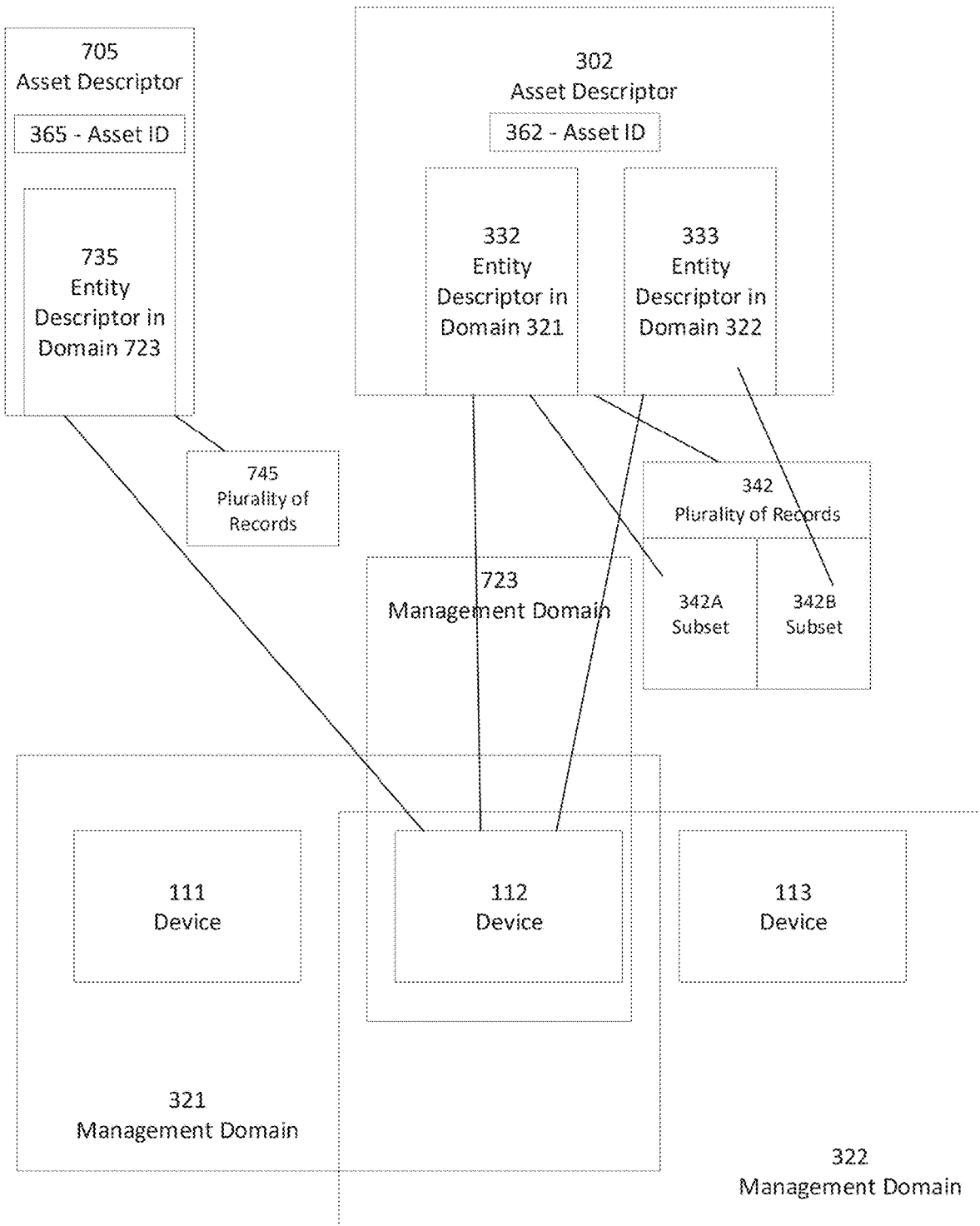
FIG. 7 is another schematic block diagram of the exemplary plurality of digital asset descriptors, according to some embodiments.

Reference is now made also to FIG. 6, showing a flowchart schematically representing another optional flow of operations 600 for computing a unique identifier, according to some embodiments. Reference is now made also to FIG. 7, showing another schematic block diagram of the exemplary plurality of digital asset descriptors 300, according to some embodiments. Optionally, system 100 additionally comprises management domain 723. Optionally, asset 112 is additionally managed in management domain 723. Optionally, the plurality of asset descriptors 310 additionally comprises asset descriptor 705 that describes asset 112. Optionally asset descriptor 705 comprises one or more additional entity descriptor 735 that describes asset 112 in management domain 723. Optionally, asset descriptor 705 comprises asset identifier 365 that identifies asset 112 in management domain 723, and optionally uniquely identifies asset 112 in the plurality of asset descriptors 300. Optionally, asset descriptor 705 and entity descriptor 735 are each associated with a plurality of additional records 745, optionally received from another domain manager of management domain 723.

Reference is now made again to FIG. 6. Optionally, in 610 processor 101 identifies in the plurality of asset identifiers 310 at least one additional asset descriptor that describes the asset 112, for example asset descriptor 705. In 620 processor 101 optionally merges the at least one additional asset descriptor 705 with asset descriptor 302, and in 630 processor 101 optionally adds the plurality of additional records 745 of at least one additional asset descriptor 705 to the plurality of records 342 of asset descriptor 302.

Figure 8:
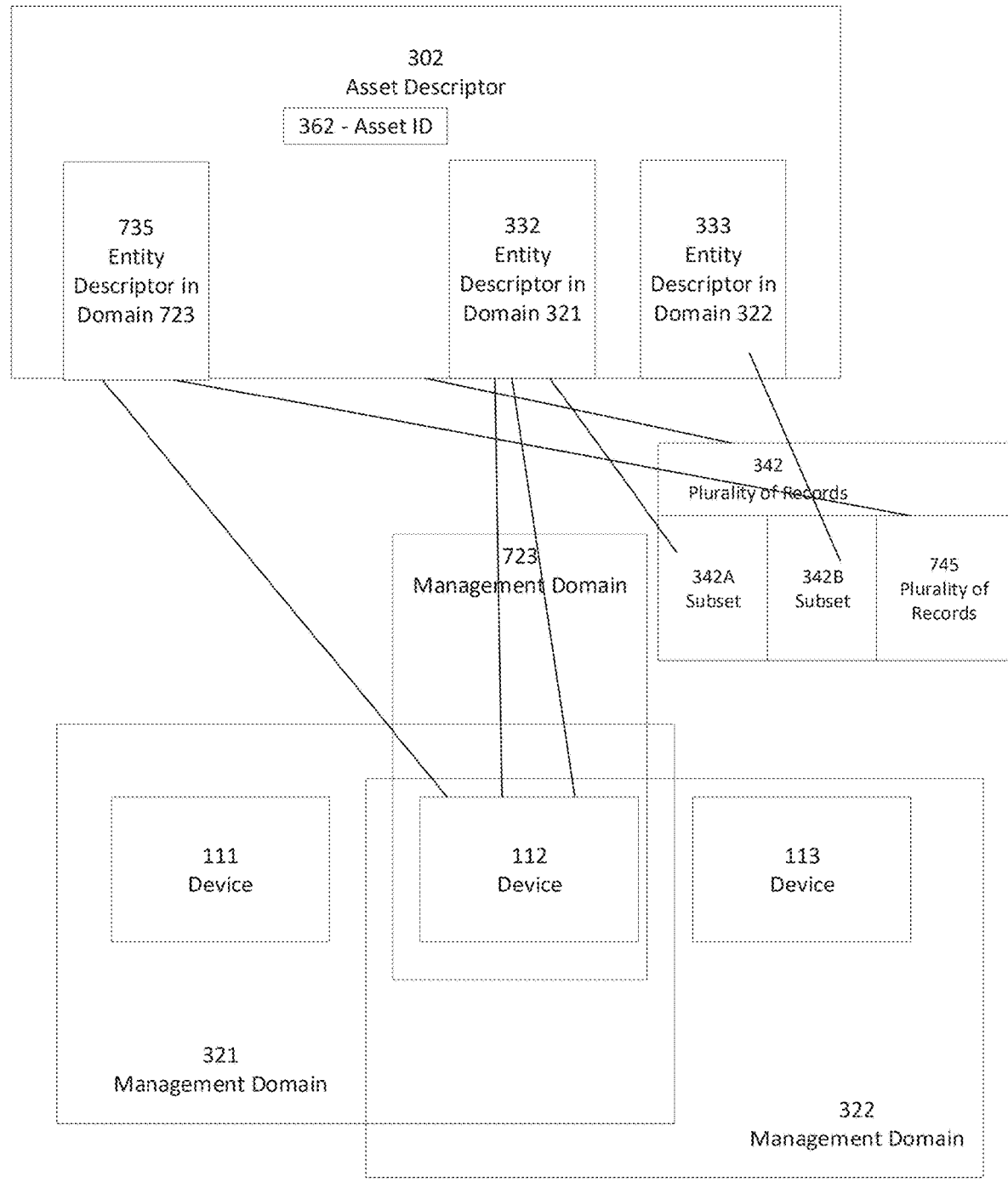
FIG. 8 is yet another schematic block diagram of the exemplary plurality of digital asset descriptors, according to some embodiments.

Reference is now made also to FIG. 8, showing yet another schematic block diagram of the exemplary plurality of digital asset descriptors 300, according to some embodiments. In this example, at least one additional entity descriptor 735 is added to asset descriptor 302 and at least one additional asset descriptor 705 is removed from plurality of asset descriptors 310. Optionally, plurality of additional records 745 is added to plurality of records 342.

Reference is now made again to FIG. 2. Optionally, in 210 computing the unique identifier comprises applying the reliability test to plurality of records 342 including plurality of additional records 745. Optionally, a value of asset identifier 362 of asset descriptor 302 is updated to be the unique identifier computed in 210.

Optionally, processor 101 executes 210 when there is a need to split an asset descriptor of the plurality of asset descriptors 310.

Figure 9:
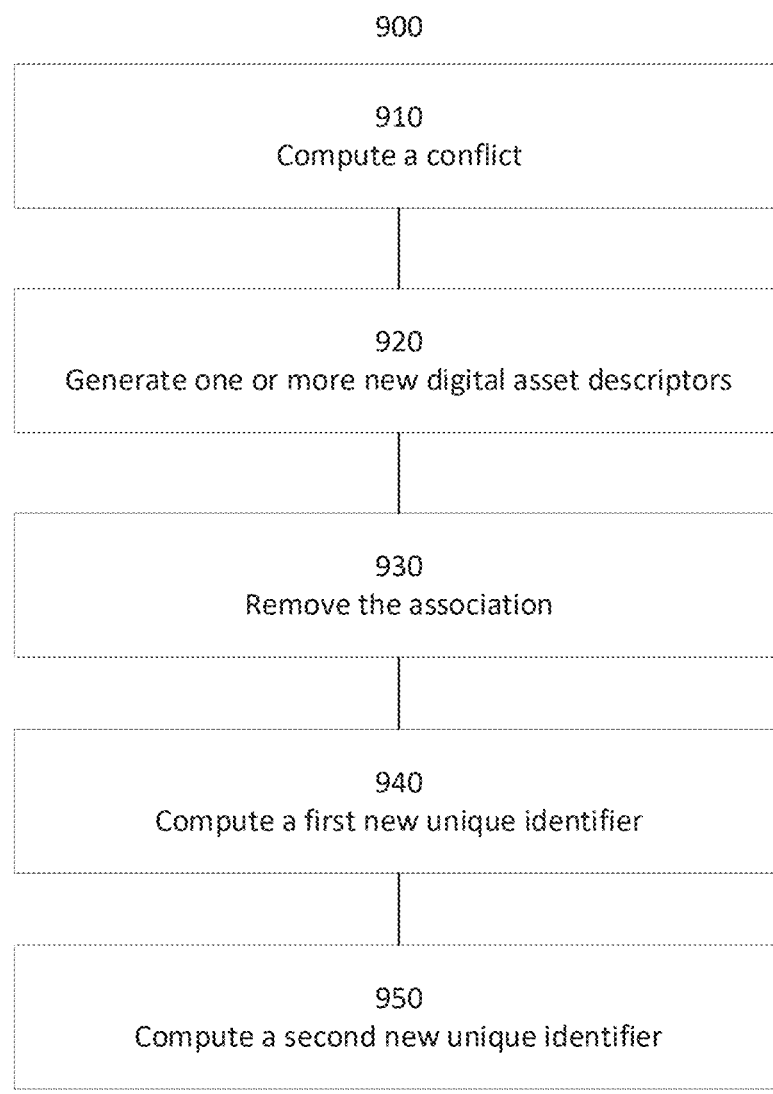
FIG. 9 is a flowchart schematically representing yet another optional flow of operations for computing a unique identifier, according to some embodiments.

Reference is now made also to FIG. 9, showing a flowchart schematically representing yet another optional flow of operations 900 for computing a unique identifier, according to some embodiments. Optionally, in 910 processor 101 computes a conflict between two or more records of the plurality of records 342, for example between a first record of subset 342A associated with management domain 321 and a second record of plurality of additional records 745 associated with additional management domain 723, for example after merging asset descriptor 302 and at least one additional asset descriptor 705. Optionally, processor 101 computes the conflict by applying one or more rules to the plurality of digital records 342. In this example, the conflict indicates that entity descriptor 735 does not describe device 112 but rather yet another asset.

Figure 10:
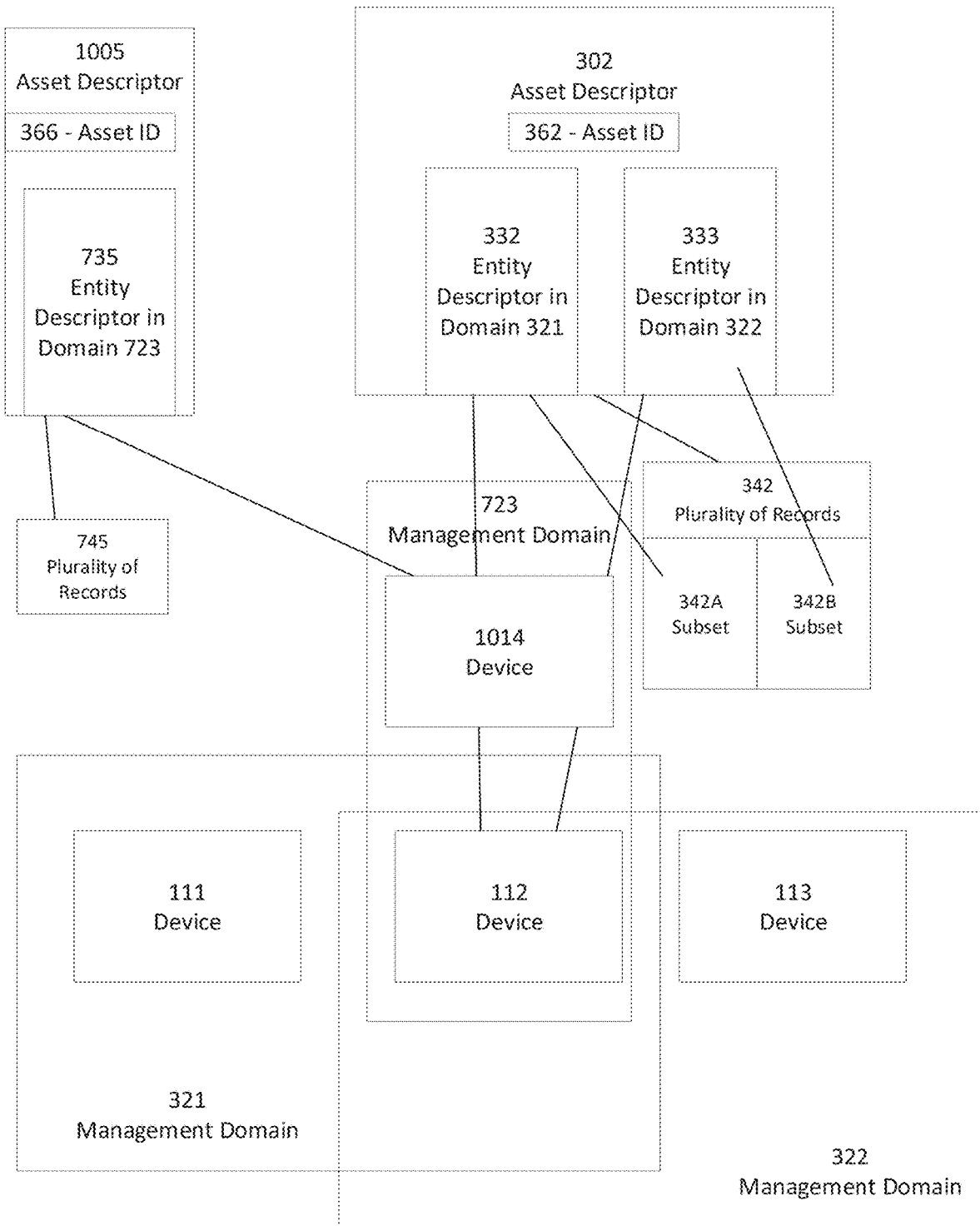
FIG. 10 is an additional other schematic block diagram of the exemplary plurality of digital asset descriptors, according to some embodiments.

Optionally, in 920 processor 101 generates one or more new digital asset descriptors that describe yet another asset of the plurality of assets. Reference is now made also to FIG. 10, showing an additional other schematic block diagram of the exemplary plurality of digital asset descriptors 300, according to some embodiments. In this example, in 920 processor 101 generates one or more new digital asset descriptors 1005 that describe yet another asset, for example device 1014, which is not device 112 described by asset descriptor 302. Optionally, one or more new digital asset descriptor 1005 is associated with plurality of additional records 745 which comprises the second record of plurality of additional records 745.

Reference is now made again to FIG. 9. In 930 processor 101 removes the association between asset descriptor 302 and the plurality of additional records 745, including the second record, such that plurality of records 342 is updated. In 940 processor 101 optionally computes a first new unique identifier for asset 112. Optionally, computing the first new unique identifier comprises applying the reliability test to updated plurality of records 342.

In 950, processor 101 optionally computes a second new unique identifier for the yet another asset 1005. Optionally, computing the first new unique identifier comprises applying the reliability test to plurality of additional records 745. Optionally, the yet another new asset descriptor 1005 comprises asset identifier 366. Optionally, processor 101 sets the first new unique identifier as a value of asset identifier 366. Optionally, a value of asset identifier 366 is the same as a value of asset identifier 365 of asset descriptor 705.

Optionally, there is a need to remove one or more entity descriptors from an asset descriptor when a management domain no longer sends information regarding an entity. For example, processor 101 may identify that plurality of records 342 no longer includes records that describe entity 112 in domain 723. In this case, processor 101 optionally removes the association between asset descriptor 302 and the plurality of additional records 745, similar to what is described above in 930, and optionally computes a first new unique identifier for asset 112 as described in 940 above. In this case, processor 101 may not compute the yet other new asset descriptor 1005. In particular, processor 101 may compute first new unique identifier when asset identifier 362 was computed according to one or more records associated with entity descriptor 735 in domain 723.

Reference is now made again to FIG. 2. In 250, processor 101 optionally executes one or more management operations associated with asset 112. Optionally, the one or more management operation is executed in system 100. Optionally, the one or more management operations are executed using the updated plurality of asset descriptors produced in 430. Some examples of a management operation include, but are not limited to: modifying one or more values in one or more configuration files of the system 100, installing one or more software applications one or more of the plurality of devices of system 100, for example device 112, modifying one or more other values in one or more other configuration files of device 112, and sending a domain manager, for example domain manager 121, an instruction to execute an operation of management domain 321, optionally on device 112.

The unique identifier computed in 210 may be used to execute management operations in more than one domain, for example where there is a functional association between operations in multiple domains. Optionally, executing the one or more management operations comprises instructing domain manager 121 to execute a first operation and instructing domain manager 122 to execute a second operation.

Optionally, the one or more management operations are executed by one or more management software objects that manage at least part of system 100. Optionally, the one or more management software objects identify asset 112 according to the unique asset identifier computed in 210. Optionally, the one or more management software objects are at least part of a security management tool. Optionally, the one or more management software objects are at least part of an instrumentation software tool.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant assets will be developed and the scope of the term asset is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for managing a plurality of information technology (IT) assets of a computerized system, comprising:
computing a unique identifier for an asset of the plurality of IT assets, comprising:
for a digital asset descriptor of a plurality of digital asset descriptors, the digital asset descriptor describing the asset and comprising a plurality of digital entity descriptors and associated with a plurality of digital records, each digital entity descriptor describing the asset in a management domain and associated with a subset of the plurality of digital records, the subset of the plurality of digital records received from a domain manager of the management domain and comprising a domain identifier identifying the asset in said management domain:

applying to the plurality of digital records a reliability test to determine a highest reliability record, wherein applying the reliability test comprises: computing a plurality of reliability scores, each reliability score for a digital entity descriptor of the plurality of entity descriptors; computing a best reliability score of the plurality of reliability scores according to at least one score comparison test applied to the plurality of reliability scores; and selecting a digital record associated with the respective digital entity descriptor having the best reliability score as the highest reliability record;

assigning the domain identifier of the highest reliability record as the unique identifier for the asset; and marking the highest reliability record in the digital asset descriptor to produce an updated plurality of digital asset descriptors; and executing in the computerized system and using the updated plurality of digital asset descriptors at least one management operation associated with the asset.

2. The method of claim 1, further comprising for each other asset of at least one other asset of the plurality of IT assets computing another unique identifier, comprising:

for another digital asset descriptor of the plurality of digital asset descriptors, the other digital asset descriptor describing the other asset and comprising a plurality of other digital entity descriptors and associated with a plurality of other digital records, each other digital entity descriptor describing the other asset in the management domain and associated with a subset of the plurality of other digital records, the subset of the other plurality of digital records received from the domain manager of the management domain and comprising another domain identifier identifying the other asset in said management domain:

applying to the plurality of other digital records the reliability test to determine another highest reliability record;

assigning the other domain identifier of the other highest reliability record as the other unique identifier for the other asset; and marking the other highest reliability record in the other digital asset descriptor to produce an updated plurality of other digital asset descriptors.

3. The method of claim 1, further comprising:

identifying in the plurality of digital asset descriptors at least one additional digital asset descriptor describing the asset and comprising a plurality of additional digital entity descriptors and associated with a plurality of additional digital records;

merging the at least one additional digital asset descriptor with the digital asset descriptor; and adding the respective plurality of additional digital records of each of the at least one additional asset descriptor to the plurality of digital records associated with the digital asset descriptor;

wherein computing the unique identifier comprises applying the reliability test to the plurality of digital records including the respective plurality of additional digital records of each of the at least one additional asset descriptor.

4. The method of claim 1, wherein the plurality of digital records can be clustered into at least two subsets of digital records, each associated with one of the plurality of digital entity descriptors; and wherein the method further comprises:

computing a conflict between two or more digital records of the plurality of digital records by applying one or more rules to the plurality of digital records;

generating at least one new digital asset descriptor describing yet another asset of the plurality of IT assets, the at least one new digital asset descriptor associated with at least one digital entity descriptor of the plurality of digital entity descriptors, where the at least one digital entity descriptor is associated with yet another subset of the plurality of digital records comprising at least one digital record one of the two or more digital records;

removing the association between the digital asset descriptor and the at least one digital record to generate an updated plurality of digital records associated with the digital asset descriptor;

computing a first new unique identifier for the asset comprising applying the reliability test to the updated plurality of digital records; and computing a second new unique identifier for the yet another asset comprising applying the reliability test to the yet another subset of the plurality of digital records.

5. The method of claim 1, further comprising receiving a plurality of new digital records from one or more of the plurality of domain managers; and associating at least one new digital record of the plurality of new digital records with the digital asset descriptor to produce another updated plurality of digital records associated with the digital asset descriptor;

wherein computing the unique identifier comprises applying the reliability test to the updated plurality of digital records.

6. The method of claim 1, wherein computing the reliability score for a digital entity descriptor comprises using one or more of: a source identifier of a source of the subset of digital records associated with the digital entity descriptor, an amount of digital records in the subset of digital records associated with the digital entity descriptor, a time of arrival of one or more of the subset of digital records associated with the digital entity descriptor, a classification of a source of the subset of digital records associated with the digital entity descriptor, and a reliability ranking of a source of the subset of digital records associated with the digital entity descriptor.

7. The method of claim 1, wherein the plurality of reliability scores comprises a first reliability score computed for a first digital entity descriptor of the plurality of digital entity descriptors and a second reliability score computed for a second digital entity descriptor of the plurality of digital entity descriptors;

wherein a first subset of digital records associated with the first entity descriptor was received from a first source classified as a domain management application of a management domain;

wherein a second subset of digital records associated with the second entity descriptor was received from a second source classified as a scanning application, configured to scan the computerized system; and wherein the first reliability score is better than the second reliability score according to the at least one score comparison test applied to the plurality of reliability scores.

8. The method of claim 1, wherein the plurality of reliability scores comprises a first reliability score computed for a first digital entity descriptor of the plurality of digital entity descriptors and a second reliability score computed for a second digital entity descriptor of the plurality of digital entity descriptors;
wherein a first subset of digital records associated with the first entity descriptor was received from a first source classified as a first domain management application of a first management domain having a first reliability ranking, and a second subset of digital records associated with the second entity descriptor was received from a second source classified as a second domain management application of a second management domain having a second reliability ranking;
wherein the first reliability ranking is higher than the second reliability ranking; and
wherein the first reliability score is better than the second reliability score according to the at least one score comparison test applied to the plurality of reliability scores.

9. The method of claim 1, wherein the plurality of reliability scores comprises a first reliability score computed for a first digital entity descriptor of the plurality of digital entity descriptors and a second reliability score computed for a second digital entity descriptor of the plurality of digital entity descriptors;
wherein a first subset of records associated with the first digital entity descriptor consists of a first amount of records received from a first source and a second subset of records associated with the second digital entity descriptor consists of a second amount of records received from the second source;
wherein the first amount of records is greater than the second amount of records; and
wherein the first reliability score is better than the second reliability score according to the at least one score comparison test applied to the plurality of reliability scores.

10. The method of claim 1, wherein the plurality of reliability scores comprises a first reliability score computed for a first digital entity descriptor of the plurality of digital entity descriptors and a second reliability score computed for a second digital entity descriptor of the plurality of digital entity descriptors;
wherein a first subset of digital records associated with the first digital entity descriptor comprises a first digital record received at a first time, and a second subset of digital records associated with the second digital entity descriptor comprises a second digital record received at a second time;
wherein the first time is earlier than the second time; and
wherein the first reliability score is better than the second reliability score according to the at least one score comparison test applied to the plurality of reliability scores.

11. The method of claim 1, wherein a first subset of digital records associated with the respective digital entity descriptor having the best reliability score comprises a first digital record received at a first time and a second digital record received at a second time;
wherein the first time is earlier than the second time; and
wherein the first digital record is selected as the highest reliability record.

12. The method of claim 1, wherein the at least one management operation is executed by at least one management software object managing at least part of the computerized system; and
wherein the at least one management software object identifies the asset according to the unique asset identifier.

13. The method of claim 12, wherein the at least one management software object is at least part of a security management software tool.

14. The method of claim 12, wherein the at least one management software object is at least part of an instrumentation software tool.

15. The method of claim 1, wherein the at least one management operation is at least one of: modifying at least one value in at least one configuration file of the computerized system, installing at least one software application on at least one device of a plurality of devices of the computerized system, modifying at least one other value in at least one other configuration file of at least one device of a plurality of devices of the computerized system, and sending a domain manager of a management domain an instruction to execute an operation of the management domain.

16. The method of claim 1, wherein executing the at least one management operation comprises instructing a first domain manager of a first management domain to execute a first operation and instructing a second domain manager of a second management domain to execute a second operation.

17. The method of claim 1, wherein the asset is one of: a device of a plurality of devices of the computerized system, a software entity of a plurality of software entities of the computerized system, and a user of the computerized system.

18. A system for managing a plurality of IT assets of a computerized system comprising at least one hardware processor configured to:
compute a unique identifier for an asset of the plurality of IT assets, comprising:
for a digital asset descriptor of a plurality of digital asset descriptors, the digital asset descriptor describing the asset and comprising a plurality of digital entity descriptors and associated with a plurality of digital records, each digital entity descriptor describing the asset in a management domain and associated with a subset of the plurality of digital records, the subset of the plurality of digital records received from a domain manager of the management domain and comprising a domain identifier identifying the asset in said management domain:
applying to the plurality of digital records a reliability test to determine a highest reliability record, wherein applying the reliability test comprises: computing a plurality of reliability scores, each reliability score for a digital entity descriptor of the plurality of entity descriptors; computing a best reliability score of the plurality of reliability scores according to at least one score comparison test applied to the plurality of reliability scores; and selecting a digital record associated with the respective digital entity descriptor having the best reliability score as the highest reliability record;
assigning the domain identifier of the highest reliability record as the unique identifier for the asset; and marking the highest reliability record in the digital asset descriptor to produce an updated plurality of digital asset descriptors; and execute in the computerized system and using the updated plurality of digital asset descriptors at least one management operation associated with the asset.

19. A software program product for managing a plurality of IT assets of a computerized system, comprising:

a non-transitory computer readable storage medium;

first program instructions for computing a unique identifier for an asset of the plurality of IT assets, comprising: for a digital asset descriptor of a plurality of digital asset descriptors, the digital asset descriptor describing the asset and comprising a plurality of digital entity descriptors and associated with a plurality of digital records, each digital entity descriptor describing the asset in a management domain and associated with a subset of the plurality of digital records, the subset of the plurality of digital records received from a domain manager of the management domain and comprising a domain identifier identifying the asset in said management domain: applying to the plurality of digital records a reliability test to determine a highest reliability record, wherein applying the reliability test comprises: computing a plurality of reliability scores, each reliability score for a digital entity descriptor of the plurality of entity descriptors; computing a best reliability score of the plurality of reliability scores according to at least one score comparison test applied to the plurality of reliability scores; and selecting a digital record associated with the respective digital entity descriptor having the best reliability score as the highest reliability record; assigning the domain identifier of the highest reliability record as the unique identifier for the asset; and marking the highest reliability record in the digital asset descriptor to produce an updated plurality of digital asset descriptors; and second program instructions for executing in the computerized system and using the updated plurality of digital asset descriptors at least one management operation associated with the asset;

wherein the first and second program instructions are executed by at least one computerized processor from the non-transitory computer readable storage medium.

* * * * *